United States Patent
Jeon et al.

(10) Patent No.: US 9,257,713 B2
(45) Date of Patent: Feb. 9, 2016

(54) SOLID OXIDE FUEL CELL SYSTEM EQUIPPED WITH CARBON MONOXIDE GENERATOR USING ULTRACLEAN COAL OR GRAPHITE

(75) Inventors: Chung Hwan Jeon, Busan (KR); Jong-Pil Kim, Busan (KR); Seung Mo Kim, Busan (KR)

(73) Assignee: INSTITUTE FOR RESEARCH & INDUSTRY COOPERATION PUSAN NATIONAL UNIVERSITY, Jangjeon-Dong, Geumjeong-Gu, Busan (KR)

( * ) Notice: Subject to any disclaimer, the term of this patent is extended or adjusted under 35 U.S.C. 154(b) by 45 days.

(21) Appl. No.: 14/112,527
(22) PCT Filed: Apr. 22, 2011
(86) PCT No.: PCT/KR2011/002948
§ 371 (c)(1),
(2), (4) Date: Oct. 17, 2013
(87) PCT Pub. No.: WO2012/144675
PCT Pub. Date: Oct. 26, 2012

(65) Prior Publication Data
US 2014/0030616 A1    Jan. 30, 2014

(51) Int. Cl.
*H01M 8/06* (2006.01)
*H01M 8/02* (2006.01)
(Continued)

(52) U.S. Cl.
CPC .......... *H01M 8/0618* (2013.01); *H01M 8/0643* (2013.01); *H01M 8/0662* (2013.01); *C10J 3/00* (2013.01); *C10J 2300/093* (2013.01); *C10J 2300/0969* (2013.01); *C10J 2300/1646* (2013.01); *C10J 2300/1853* (2013.01);
(Continued)

(58) Field of Classification Search
CPC ... H01M 8/06; H01M 8/0643; H01M 8/0662; H01M 8/0618; H01M 8/02; C10J 2300/093; C10J 2300/0969; C10J 2300/1646; C10J 2300/1843
See application file for complete search history.

(56) References Cited

U.S. PATENT DOCUMENTS

| | | | | |
|---|---|---|---|---|
| 3,226,204 A | * | 12/1965 | Stotler et al. | 422/145 |
| 5,753,198 A | * | 5/1998 | Ayala et al. | 423/210 |
| 2009/0004529 A1 | * | 1/2009 | Gur et al. | 429/33 |

FOREIGN PATENT DOCUMENTS

| | | |
|---|---|---|
| JP | 2009-028715 | 2/2009 |
| KR | 10-20070057131 | 6/2007 |
| KR | 10-0802283 | 2/2008 |

*Primary Examiner* — Kenneth Douyette
(74) *Attorney, Agent, or Firm* — John K. Park; Park Law Firm

(57) ABSTRACT

A solid oxide fuel cell system has a carbon monoxide generator using ash-free coal or graphite, which includes a carbon supply unit, a carbon dioxide supply unit, a carbon monoxide generating unit, and a fuel cell unit. The carbon monoxide generating unit supplies CO to the anode of the fuel cell unit, and $CO_2$ discharged from the fuel cell unit is recycled to the carbon dioxide supply unit. Because ash-free coal or graphite is used, a separate reformer does not need to be used, and thus energy can be produced with high efficiency even at low costs. Because $CO_2$ discharged from the solid oxide fuel cell, which uses carbon monoxide as a fuel, after a fuel cell reaction, is reused as reactant gas, carbon dioxide is not emitted into the atmosphere. Gasification can be smoothly achieved by the carbon monoxide generating unit including heating powder or a heating reaction chamber.

1 Claim, 3 Drawing Sheets

(51) Int. Cl.
*C10J 3/00* (2006.01)
*H01M 8/12* (2006.01)

(52) U.S. Cl.
CPC ........ *H01M2008/1293* (2013.01); *Y02E 60/50* (2013.01); *Y02E 60/525* (2013.01)

SOLID OXIDE FUEL CELL SYSTEM EQUIPPED WITH CARBON MONOXIDE GENERATOR USING ULTRACLEAN COAL OR GRAPHITE

TECHNICAL FIELD

The present invention relates to a solid oxide fuel cell system having a carbon monoxide generator using ash-free coal or graphite, and more particularly to a solid oxide fuel cell system comprising a carbon monoxide generator using ash-free coal or graphite, in which ash-free coal or graphite is used, and thus energy can be produced with high efficiency even at low costs without having to use a separate reformer, and $CO_2$ discharged from the solid oxide fuel cell, which uses carbon monoxide as a fuel, after a fuel cell reaction, is reused as reactant gas, and thus carbon dioxide is not discharged.

BACKGROUND ART

Currently, energy production in Korea heavily relies on fossil fuels that are almost all imported from foreign countries, but because of an increase in the use of fossil fuels and concern about the exhaustion thereof, raw material prices are increasing rapidly. The percentage of coal in the energy source for power generation in Korea in the year is 41.4%, which is higher than 33.2% for nuclear fuel and 19.2% for natural gas. Although domestic dependence on coal is high as described above, international coal prices are rising annually due to a global need for coal utilization together with rises in international oil prices, and thus the development of technology for efficient use of coal is needed. In addition, as the United Nations Convention on Climate Change receive global attention, coal power generation that can generate power in the most cost-effective manner receives as a main cause of carbon emissions, coal power generation technology has been studied in order to increase power generation efficiency while solving $CO_2$ emission problems.

Meanwhile, fuel cells have received attention as energy conversion systems capable of substituting for internal combustion engines, and many studies thereon have been conducted. Among several kinds of fuel cells, a solid oxide fuel cell (SOFC) is operated at a high temperature of 600-1000° C., and thus has the highest power conversion efficiency and enables heat recovery and co-generation using good-quality waste heat, thereby increasing the efficiency of the entire power generation system. In addition, SOFC has advantages in that it does not need to use a noble metal catalyst, because it has high electrode activity due to its high operating temperature, and in that it can use various fuels, including hydrogen ($H_2$), carbon monoxide (CO), and hydrocarbon fuels such as methane ($CH_4$). Because of such advantages of high powder density and high efficiency, active studies on the use of SOFC for home power generation systems or distributed power generation systems have been conducted.

However, when methane or carbon monoxide is used as a fuel for SOFC, carbon is generated during its oxidation and decomposition. Particularly, when carbon monoxide alone is supplied as the fuel, carbon is deposited on the surface of a Ni-YSZ anode to reduce a space in which a reaction can occur. Therefore, a fuel cell having a new structure needs to be suggested which is capable of overcoming the problem associated with the reduction in fuel cell performance caused by this carbon deposition.

In addition, a coal gasification reaction is a reforming reaction consisting of a steam reforming reaction ($C+H_2O \rightarrow CO+H_2$) and a carbon dioxide reforming reaction ($C+CO_2 \rightarrow 2CO$). This reforming reaction is an endothermic reaction that absorbs heat comparable to that absorbed by a combustion reaction ($C+O_2 \rightarrow CO_2$). Thus, in order to perform coal gasification (carbon reforming), a considerable amount of reaction heat should be provided. However, conventional coal gasifiers have shortcomings in that a coal reforming reaction is not satisfactorily achieved due to limited reaction temperature and in that the internal temperature of the coal gasifier is not uniformly maintained.

DISCLOSURE OF INVENTION

Technical Problem

The present invention has been made in order to the above-described problems occurring in the art, and it is an object of the present invention to provide a solid oxide fuel cell system having a carbon monoxide generator using ash-free coal or graphite, in which ultraclean coal or graphite is used, and thus energy can be produced with high efficiency even at low costs without having to use a separate reformer, and $CO_2$ discharged from the solid oxide fuel cell, which uses carbon monoxide as a fuel, after a fuel cell reaction, is reused as reactant gas, and thus carbon dioxide is not discharged.

Another object of the present invention is to provide a solid oxide fuel cell system having a carbon monoxide generator using ash-free coal or graphite, in which the ion conductivity of an electrolyte in the solid oxide fuel cell can be increased, deposition of carbon on the surface of an anode can be prevented, and the strength of the cell can also be improved.

Still another object of the present invention is to provide a solid oxide fuel cell system having a carbon monoxide generator using ash-free coal or graphite, in which a gasification reaction can be effectively achieved, even when the internal temperature of a gasifier is not greatly increased.

Technical Solution

To achieve the above objects, the present invention provides a solid oxide fuel cell system having a carbon monoxide generator using ash-free coal or graphite, the system including: a carbon supply unit configured to supply carbon powder composed of ash-free coal or graphite; a carbon dioxide supply unit configured to supply $CO_2$; a carbon monoxide generating unit configured to produce CO by reacting the carbon powder supplied from the carbon supply unit with $CO_2$ supplied from the carbon dioxide supply unit; and a fuel cell unit including at least one solid oxide fuel cell (SOFC) having an anode and a cathode, wherein the carbon monoxide generating unit is configured to supply CO to the anode of the fuel cell unit, and $CO_2$ discharged from the fuel cell unit is recycled to the carbon dioxide supply unit so that carbon dioxide is not emitted into the atmosphere.

Herein, the solid oxide fuel cell may be preferably formed by sequentially coating a cathode, an electrolyte and an anode of thin layers on a porous support.

Further, the carbon monoxide generating unit may include heating powder made of a highly heat-resistant material that is not melted at reaction temperature, and the heating powder is distributed throughout the internal space of the carbon monoxide generating unit so that CO can be produced by the reaction of the carbon powder with $CO_2$ in a fluidized state.

In addition, the carbon monoxide generating unit may include a furnace having an inlet and an outlet, and a plurality of reaction chambers that are provided in the furnace and fixed to the outer circumference of the inlet, and each of the plurality of reaction chambers has a through-hole formed at one end thereof so that a multilayer flow channel extending from the inlet to the outlet is formed.

Herein, at least one of the plurality of reaction chambers may comprise a heating reaction chamber having inserted therein a resistance heating element connected to a power source.

Advantageous Effect

The solid oxide fuel cell system according to the present invention has the following effects.

First, because ash-free coal or graphite is used, a separate reformer does not need to be used, and thus energy can be used with high efficiency even at low costs, and because $CO_2$ discharged from the solid oxide fuel cell, which uses carbon monoxide as a fuel, after a fuel cell reaction, is reused as reactant gas, carbon dioxide is not emitted into the atmosphere.

Second, because the solid oxide fuel cell is formed by sequentially depositing a cathode, an electrolyte and an anode on a porous support to form thin layers, the ion conductivity of the electrolyte in the solid oxide fuel cell can be increased, deposition of carbon on the surface of the anode can be prevented, and the strength of the cell can also be improved.

Third, because heating powder made of a highly heat-resistant material that is not melted at the gasification reaction temperature is distributed throughout the internal space of the carbon monoxide generating unit, CO can be smoothly produced by the reaction of carbon powder with $CO_2$ in a fluidized state.

Fourth, because a plurality of reaction chambers are provided in the carbon monoxide generating chamber in the form of layers, the retention time of carbon powder and $CO_2$ in a furnace can be increased, and thus gasification can be effectively achieved.

Fifth, because at least one of the plurality of reaction chambers consists of a heating reaction chamber having inserted therein a resistance heating element connected to a power source, a gasification reaction can be achieved even when the internal temperature of the furnace is not greatly increased.

BEST MODE FOR CARRYING OUT THE INVENTION

Hereinafter, preferred embodiments of the present invention will be described in detail with reference to the accompanying drawings. However, these embodiments are provided to completely explain the present invention to those skilled in the art so that the present invention can be easily carried out by those skilled in the art, and the technical spirit and scope of the present invention are not limited thereto.

Figure 1:
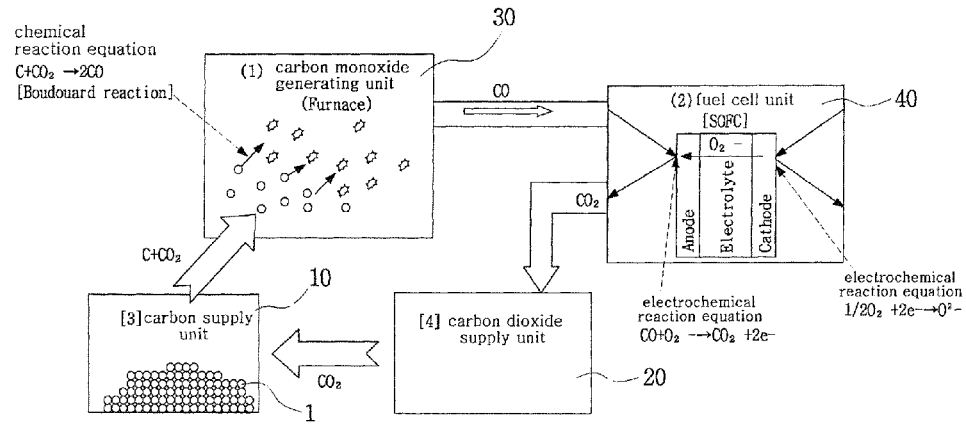
FIG. 1 shows the schematic configuration of a solid oxide fuel cell system comprising a carbon monoxide generator using ash-free coal or graphite according to an embodiment of the present invention.
Figure 2:
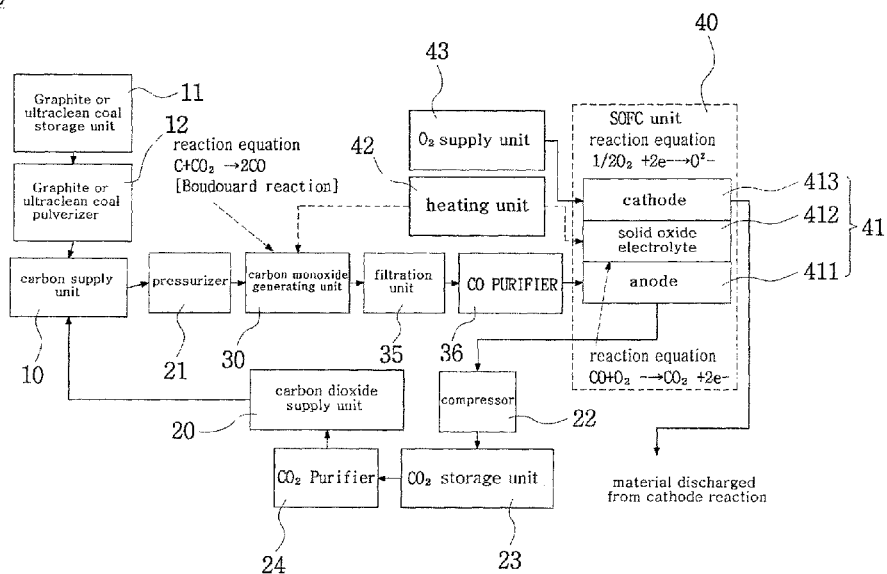
FIG. 2 is a block diagram of a solid oxide fuel cell system comprising a carbon monoxide generator using ash-free coal or graphite according to an embodiment of the present invention.

FIGS. 1 and 2 are a schematic diagram and block diagram of a solid oxide fuel cell system 100 having a carbon dioxide generator using ash-free coal or graphite according to an example of the present invention.

The solid oxide fuel cell system 100 comprising a carbon dioxide generator using ash-free coal or graphite according to an embodiment of the present invention comprises a carbon supply unit 10, a carbon dioxide supply unit 20, a carbon monoxide generating unit 30 and a fuel cell unit 40.

The carbon supply unit 10 functions to supply carbon powder consisting of ash-free coal or graphite to the carbon monoxide generating unit 30. Herein, the term "ash-free coal" refers to coal obtained by removing an ash component by a pretreatment process and means low-ash coal or ashless coal obtained by extracting only carbon components and combustible components from brown coal (which is abundantly reserved worldwide, but has lower utility than bituminous due to its high water content and high spontaneous combustion possibility) and subbituminous by solvent extraction technology. The present invention is advantageous in that, because ash-free coal or graphite is used in place of raw coal containing N, O, H and the like, a separate reformer does not need to be used so that the configuration of the system can be simplified, and the emission of air pollutants can be prevented. Large particles in ash-free coal have a size of about 3 mm, and ash-free coal may be stored in a storage unit 11 and used without any treatment. However, in order to enlarge the surface area of ash-free coal and to increase reactivity, ash-free coal is preferably pulverized by a pulverizer 13 and supplied to the carbon monoxide generating unit 30.

The carbon dioxide supply unit 20 functions to supply $CO_2$ to the carbon monoxide generating unit 30 and is configured such that it injects $CO_2$ into the carbon supply unit 10 so that carbon dioxide can also be used as a carrier gas that transports carbon powder to the carbon monoxide generating unit 30. Meanwhile, a pressurizer 21 is provided in front of the carbon monoxide generating unit 30 in order to inject a mixture of carbon dioxide and carbon powder into the carbon monoxide generating unit 30 under pressure so that the reaction is smoothly carried out under high pressure. Particularly, the system of the present invention is configured such that $CO_2$ discharged from the fuel cell unit 40 is recycled to the carbon dioxide supply unit 20 so that carbon dioxide is reused as reactant gas without being emitted into the atmosphere. For this purpose, $CO_2$ discharged from an anode 411 is preferably recycled to the carbon dioxide supply unit 20 through a compressor 22, a $CO_2$ storage unit 23 and a $CO_2$ purifier 24.

The carbon monoxide generating unit 30 comprises a heating unit 42 in order to allow carbon powder from the carbon supply unit 10 to react with $CO_2$ from the carbon dioxide supply unit 20 at high temperature to produce CO ($C+CO_2 \rightarrow 2CO$; Boudouard reaction) and maintain the reaction temperature at a suitable level. The carbon monoxide thus produced is supplied to an anode 411 of the fuel cell unit 40 to generate powder. In front of the anode 411, a filter 35 for filtering out carbon powder and a CO purifier 36 are provided so that the purified carbon monoxide can be supplied to the anode 411. As described above, in the present invention, pure carbon graphite or pretreated ash-free coal is used, and thus carbon monoxide can be more effectively produced by reaction of graphite or ash-free coal with carbon dioxide.

The fuel cell unit 40 includes at least one solid oxide fuel cell (SOFC) comprising an anode 411 and a cathode 413. The solid oxide fuel cell comprises the cathode 413 that reduces molecular oxygen, supplied from the $O_2$ supply unit 43, into an oxygen ion, and the anode 411 that performs the electrochemical oxidation of fuel and transfers charges to the outside. The SOFC may adopt various forms known in the art.

Thus, the solid oxide fuel cell system 100 of the present invention has advantages in that, because ash-free coal or graphite is used, a separate reformer does not needed to be used, making it possible to produce energy with high efficiency even at low costs, and because $CO_2$ discharged from the solid oxide fuel cell, which uses carbon monoxide as a fuel, after the fuel cell reaction, is reused as reactant gas, carbon dioxide is not emitted into the atmosphere.

Figure 3:
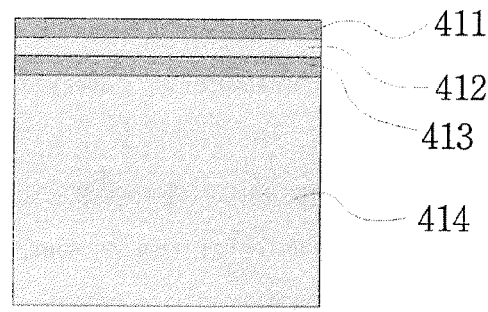
FIG. 3 is a cross-sectional view of a solid oxide fuel cell according to an embodiment of the present invention.

FIG. 3 is a cross-sectional view of a solid oxide fuel cell according to an embodiment of the present invention.

A solid oxide fuel cell according to an embodiment of the present invention is formed by sequentially depositing a cathode 413, an electrolyte 412 and an anode 411 on a porous support 414 to form thin layers.

The anode material Ni-YSZ of general SOFC has a shortcoming in that carbon is likely to be deposited on the anode material when hydrocarbon-based fuel such as methane or carbon monoxide is used as a fuel. Due to this shortcoming, it is not suitable to apply the Ni-YSZ to hydrocarbon-based fuel systems. In order to prevent this carbon deposition, the anode is required to have a thin thickness. Thus, the SOFC 41 of the present invention is formed by depositing the anode 411, the electrolyte 412 and the cathode 413 on the porous support 414 to thin thicknesses. In addition, because the electrolyte 412 is formed to have a thin thickness, its ion conductivity can be increased, and because the support 414 is formed to have a relatively large thickness, the strength of the cell can be increased.

Meanwhile, the support is preferably made of 3 mol-YSZ having a thermal expansion coefficient similar to that of 8 mol-YSZ that is used commonly in the cathode (LSM/YSZ), electrolyte (YSZ), anode (NiO/YSZ) of the SOFC. In addition, in order to control the strength and porosity of the structure, the amount of active carbon in the support 414 is preferably controlled to about 40%. This structure may be applied not only to a tube-type SOFC, but also to a flat panel-type SOFC.

Figure 4:
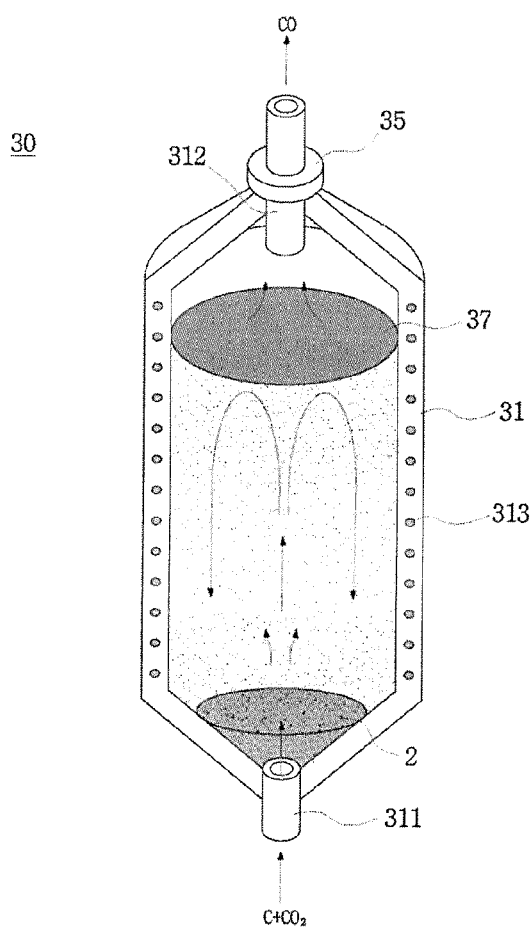
FIG. 4 shows the operating state of a carbon monoxide generating unit according to an embodiment of the present invention.

Consequently, the solid oxide fuel cell of the present invention has advantages in that, because it is formed by sequentially coating the cathode 413, the electrolyte 412 and the anode 411 of thin layers on the porous support 414, the ion conductivity of the electrolyte 412 can be increased, deposition of carbon on the surface of the anode 411 can be prevented, and the strength of the cell can also be increased. FIG. 4 shows the operating state of a carbon monoxide generating unit 30 according to an embodiment of the present invention.

The carbon monoxide generating unit 30 according to an embodiment of the present invention includes heating powder made of a highly heat-resistant material that is not melted at the reaction temperature.

The Boudouard reaction that produces carbon monoxide generally occurs at a temperature of 700° C., or higher. Conventional coal gasifiers have problems in that the coal reforming reaction is not satisfactorily achieved due to limited reaction temperature and in that the internal temperature of the coal gasifier is not uniformly maintained. In order to solve such problems, in the present invention, heating powder 2 is distributed throughout the internal space of the carbon monoxide generating unit 30 so that a high-temperature gasification reaction can occur by the contact between carbon powder 1 and the heating powder heated by a heating element 313 in a furnace 31. This can be applied to a fluidized-bed gasifier.

The heating powder 2 is dispersed and distributed throughout the internal space of the carbon monoxide generating unit 30 by carbon powder and carbon dioxide, which are deposited in the carbon monoxide generating unit 30 and injected by the pressurizer 21. If necessary, a heating powder filter 37 may be provided in the upper portion of the carbon monoxide generating unit 30. The heating powder 2 is made of a material having excellent heat resistance, abrasion resistance and oxidation resistance so as not be melted in the carbon monoxide generating unit 30. Particularly, the heating powder 2 is preferably made of silica carbide (SiC), which is not melted at high temperatures, has excellent thermal conductivity and is chemically stable.

Figure 5:
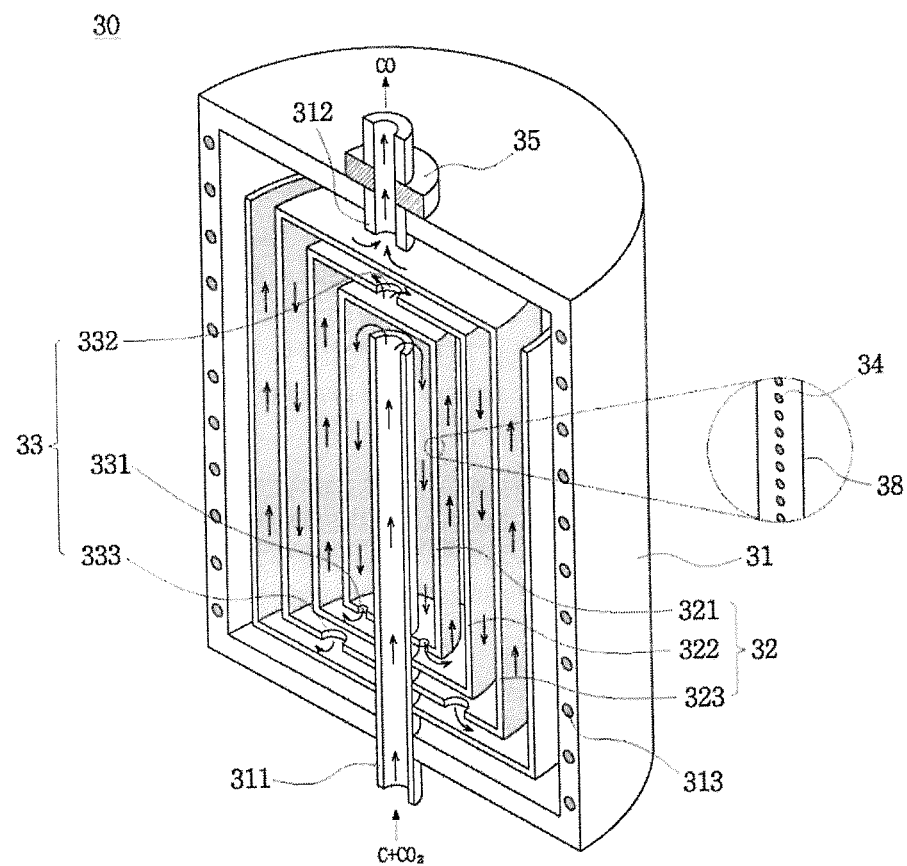
FIG. 5 shows the operating state of a carbon monoxide generating unit according to another embodiment of the present invention.

FIG. 5 shows the operating state of a carbon monoxide generating unit 30 according to another embodiment of the present invention.

A carbon monoxide generating unit 30 according to another embodiment of the present invention includes a plurality of reaction chambers 32, 321, 322 and 323 that are provided in the form of layers in a furnace 31.

The furnace 31 comprises a heating element 313 so that a temperature suitable for the gasification reaction can be maintained. In addition, the furnace 31 comprises an inlet 311 through which the reactants carbon powder and $CO_2$ are supplied, and an outlet 312 through which produced CO is discharged after the gasification reaction.

The furnace 32 includes a plurality of the reaction chambers 32 that are fixed to the outer circumference of the inlet 311 in the form of layers. Herein, each of the reaction chambers 321, 322 and 323 has a through-hole 33, 331, 332 or 333 formed at one end thereof so that a multilayer flow channel extending from the inlet 311 to the outlet 312 is formed. This can be applied to an entrained-bed gasifier.

Thus, there is an advantage in that the retention time of carbon powder and $CO_2$ in the furnace 31 can be increased so that gasification can be effectively achieved.

Meanwhile, in the carbon monoxide generating unit 30 including the plurality of reaction chambers 32 according to an embodiment of the present invention, at least one of the reaction chambers 32 preferably consists of a heating reaction chamber 38 having inserted therein a resistance heating element 34 connected to a powder source.

The resistance heating element 34 is made of a non-metallic heating element such a silicon carbide and is inserted into the wall of the reaction chamber 38. The resistance heating element 34 serves to directly heat carbon powder using heat generated when applying electric current to the resistance heating element 34 or indirectly heat carbon powder by conduction or the like, thereby causing a gasification reaction. For heating to high temperatures, silicon carbide, kanthal wires or molybdenum silicide is preferably used. In addition, resistance heating has advantages in that it enables a high temperature to be efficiently obtained and can easily control temperature.

Thus, the gasification reaction can be smoothly performed, even if the internal temperature of the furnace is not greatly increased.

As described above, in the solid oxide fuel cell system 100 comprising the carbon monoxide generator using ash-free coal or graphite, because ash-free coal or graphite is used, a separate reformer does not need to be used, and thus energy can be produced with high efficiency even at low costs. Further, because $CO_2$ discharged from the solid oxide fuel cell, which uses carbon dioxide as a fuel, after the fuel cell reaction, is reused as reactant gas, carbon dioxide is not emitted into the atmosphere. In addition, advantageously, gasification can be smoothly achieved by the carbon monoxide generating unit 30 including the heating powder 2 or the heating reaction chamber 38.

MODE FOR INVENTION

In a preferred embodiment, the present invention is directed to a solid oxide fuel cell system having a carbon monoxide generator using ash-free coal or graphite, the system including: a carbon supply unit configured to supply carbon powder composed of ash-free powder or graphite; a carbon dioxide supply unit configured to supply $CO_2$; a carbon monoxide generating unit configured to produce CO by reacting the carbon powder supplied from the carbon supply unit with $CO_2$ supplied from the carbon dioxide supply unit; and a fuel cell unit including at least one solid oxide fuel cell (SOFC) having an anode and a cathode, wherein the carbon monoxide generating unit is configured to supply CO to the anode of the fuel cell unit, and $CO_2$ discharged from the fuel cell unit is recycled to the carbon dioxide supply unit so that carbon dioxide is not emitted into the atmosphere.

In addition, the solid oxide fuel cell is formed by sequentially depositing a cathode, an electrolyte and an anode on a porous support to form thin layers.

Further, the carbon monoxide generating unit includes heating powder made of a highly heat-resistant material that is not melted at reaction temperature, and the heating powder is distributed throughout the internal space of the carbon monoxide generating unit so that CO can be produced by the reaction of the carbon powder with $CO_2$ in a fluidized state.

Besides, the carbon monoxide generating unit includes a furnace having an inlet and an outlet, and a plurality of reaction chambers that are provided in the furnace and fixed to the outer circumference of the inlet, and each of the plurality of reaction chambers has a through-hole formed at one end thereof so that a multilayer flow channel extending from the inlet to the outlet is formed.

Moreover, at least one of the plurality of reaction chambers is a heating reaction chamber having inserted therein a resistance heating element connected to a power source.

INDUSTRIAL APPLICABILITY

As described above, in the solid oxide fuel cell system according to the present invention, ash-free coal or graphite is used, and thus energy can be produced with high efficiency even at low cost without having to use a separate. In addition, $CO_2$ discharged from the solid oxide fuel cell, which uses carbon monoxide as a fuel, after the fuel cell reaction, is reused as reactant gas, and thus carbon dioxide is not emitted into the atmosphere. Thus, the present invention is highly industrially applicable.

The invention claimed is:

1. A solid oxide fuel cell system having a carbon monoxide generator using low-ash coal or ashless coal or graphite, the system comprising:
    a carbon supply unit configured to supply carbon powder composed of low-ash coal or ashless coal or graphite;
    a carbon dioxide supply unit configured to supply $CO_2$;
    a carbon monoxide generating unit configured to produce CO by reacting the carbon powder supplied from the carbon supply unit with $CO_2$ supplied from the carbon dioxide supply unit; and
    a fuel cell unit including at least one solid oxide fuel cell (SOFC) having an anode and a cathode, wherein the carbon monoxide generating unit is configured to supply CO to the anode of the fuel cell unit, and $CO_2$ discharged from the fuel cell unit is recycled to the carbon dioxide supply unit so that carbon dioxide is not emitted into the atmosphere,
    wherein the solid oxide fuel cell is formed by sequentially coating a cathode, an electrolyte and an anode of layers on a porous support,
    wherein the carbon monoxide generating unit comprises heating powder made of a heat-resistant material that is not melted at reaction temperature, and the heating powder is distributed throughout the internal space of the carbon monoxide generating unit so that CO is produced by the reaction of the carbon powder with $CO_2$ in a fluidized state,
    wherein the carbon monoxide generating unit comprises a furnace having an inlet and an outlet, and a plurality of reaction chambers that are provided in the furnace and fixed to the outer circumference of the inlet, and each of the plurality of reaction chambers has a through-hole formed at one end thereof so that a multilayer flow channel extending from the inlet to the outlet is formed, and
    wherein at least one of the plurality of reaction chambers comprises a heating reaction chamber having inserted therein a resistance heating element connected to a power source.

\* \* \* \* \*

UNITED STATES PATENT AND TRADEMARK OFFICE
CERTIFICATE OF CORRECTION

PATENT NO. : 9,257,713 B2  
APPLICATION NO. : 14/112527  
DATED : February 9, 2016  
INVENTOR(S) : Chung Hwan Jeon, Jong-Pil Kim and Seung Mo Kim Page 1 of 1

It is certified that error appears in the above-identified patent and that said Letters Patent is hereby corrected as shown below:

On the title page item 54 and in the specification column 1 lines 1-4, the title of the invention should read:
SOLID OXIDE FUEL CELL SYSTEM EQUIPPED WITH CARBON MONOXIDE GENERATOR USING ASH-FREE COAL OR GRAPHITE

Signed and Sealed this  
Twenty-first Day of June, 2016

Michelle K. Lee  
*Director of the United States Patent and Trademark Office*